(12) United States Patent
Miyoshi et al.

(10) Patent No.: US 7,961,811 B2
(45) Date of Patent: Jun. 14, 2011

(54) RADIO TRANSMITTING APPARATUS AND RADIO TRANSMITTING METHOD

(75) Inventors: Kenichi Miyoshi, Kanagawa (JP); Akihiko Nishio, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 689 days.

(21) Appl. No.: 12/064,698

(22) PCT Filed: Aug. 25, 2006

(86) PCT No.: PCT/JP2006/316761
§ 371 (c)(1),
(2), (4) Date: Feb. 25, 2008

(87) PCT Pub. No.: WO2007/023958
PCT Pub. Date: Mar. 1, 2007

(65) Prior Publication Data
US 2009/0245413 A1    Oct. 1, 2009

(30) Foreign Application Priority Data

Aug. 26, 2005    (JP) ................................. 2005-245431

(51) Int. Cl.
*H04L 27/00* (2006.01)
*H04L 7/06* (2006.01)
*H04L 7/00* (2006.01)
*H04J 11/00* (2006.01)
*H04J 3/06* (2006.01)

(52) U.S. Cl. ........ 375/295; 375/364; 375/366; 370/210; 370/513

(58) Field of Classification Search .................. 375/295, 375/260, 362–367; 370/343, 344, 345, 347, 370/503, 509–514
See application file for complete search history.

(56) References Cited

U.S. PATENT DOCUMENTS

| 6,714,511 | B1 * | 3/2004 | Sudo et al. ..................... 370/208 |
| 7,391,828 | B2 * | 6/2008 | Liu et al. ....................... 375/342 |
| 2003/0090994 | A1 | 5/2003 | Kikura |
| 2004/0160987 | A1 * | 8/2004 | Sudo et al. ..................... 370/480 |

(Continued)

FOREIGN PATENT DOCUMENTS

JP    2002-374223    12/2002

(Continued)

OTHER PUBLICATIONS

Ali Ramadan et al., "Adaptive Gourd Interval Length for OFDM-Based WLAN System in Frequency Selective Channels," first European Wireless Technology Conference, 2008, pp. 115-118.*
International Search Report dated Oct. 24, 2006.

*Primary Examiner* — Tesfaldet Bocure
(74) *Attorney, Agent, or Firm* — Dickinson Wright PLLC

(57) ABSTRACT

A radio transmitting apparatus and method thereof wherein a guard interval (GI) having a variable length allows a radio receiving apparatus to precisely and easily obtain a symbol synchronization. A GI adding part adds a short GI or a long GI to the head of each of a plurality of data parts. In a case of adding the long GI, the GI adding part copies the symbols of a portion of a second data part, which immediately follows a first data part, including the rear of the second data part, and then adds the copied symbols to the head of the first data part, thereby providing a second GI. Moreover, the GI adding part copies the symbols to a portion of the first data part including the rear thereof, and then adds the copied symbols to the head of the second GI, thereby providing the first GI.

3 Claims, 5 Drawing Sheets

U.S. PATENT DOCUMENTS

| | | |
|---|---|---|
| 2004/0161047 A1 | 8/2004 | Liu |
| 2005/0008088 A1* | 1/2005 | Liu et al. ............... 375/260 |
| 2005/0099936 A1 | 5/2005 | Fujii |
| 2005/0276242 A1* | 12/2005 | Goto et al. ............. 370/328 |
| 2006/0034389 A1* | 2/2006 | Aoki ........................ 375/299 |
| 2006/0140303 A1* | 6/2006 | Egashira et al. ........ 375/299 |
| 2006/0270364 A1* | 11/2006 | Aoki ........................ 455/101 |
| 2009/0285321 A1* | 11/2009 | Schulz et al. ............ 375/267 |
| 2010/0202301 A1* | 8/2010 | Wen et al. ................ 370/252 |

FOREIGN PATENT DOCUMENTS

| | | |
|---|---|---|
| JP | 2003-152670 | 5/2003 |
| JP | 2005-130010 | 5/2005 |
| JP | 2005-150850 | 6/2005 |

* cited by examiner

RADIO TRANSMITTING APPARATUS AND RADIO TRANSMITTING METHOD

TECHNICAL FIELD

The present invention relates to a radio transmitting apparatus and radio transmitting method for changing a guard interval length.

BACKGROUND ART

In mobile communication systems, after a mobile station is switched on, to receive a signal from a base station, the mobile station needs to synchronize timing to receive the signal transmitted from the base station. To synchronize timing, first, the mobile station performs symbol synchronization for the signal transmitted from the base station. Here, symbol synchronization means detecting the timing at which the data symbol is transmitted in the received signal.

FIG. 1 illustrates a format of a transmission signal from a base station. Further, FIG. 1 illustrates a state where a guard interval (hereinafter simply "GI") is inserted in an OFDM (Orthogonal Frequency Division Multiplexing) scheme or in a single carrier scheme. In symbol synchronization processing, characteristics of GI are used to detect the symbol timing of a transmitted signal. That is, the GI copies a part of the last part of symbol and attaches the copied symbol to the head of the symbol, so that it is possible to perform symbol synchronization by operating an autocorrelation detecting circuit in the receiver.

The autocorrelation detecting circuit detects as an autocorrelation value the value estimated by multiplexing a received signal with a signal delayed by the symbol length $\tau d$ of data symbol. As shown in the result of autocorrelation detection of FIG. 2, the autocorrelation detecting circuit detects peaks of the autocorrelation value in a cycle of 1s ($\tau d$+GI length). By this means, the mobile station can detect the symbol timing.

By the way, Patent Document 1 discloses such a technique of controlling the GI length. To be more specific, Patent Document 1 discloses a technique of controlling the GI length such that the maximum delay time of delay waves is short and consequently the GI length is made shorter in a mobile station near the base station, and that the maximum delay time of delay waves is long and consequently the GI length is made longer in a mobile station far from the base station.

Patent Document 1: Japanese Patent Application Laid-Open No. 2005-150850

DISCLOSURE OF INVENTION

Problems to be Solved by the Invention

However, with the technique disclosed in above-disclosed Patent Document 1, reliable symbol synchronization cannot be realized in a mobile station, because the data symbol to be multiplied with a received signal is delayed by symbol length $\tau d$ in the autocorrelation circuit, and consequently, if the GI length is variable, as shown in FIG. 3, data for multiplication varies and the autocorrelation value cannot be detected.

Here, to support the variable GI length, providing a plurality of autocorrelation detecting circuits with respective delay times and combining outputs of these circuits can be performed. However, in this case, the circuit scale will increase. Further, although changing the setting of the delay according to the GI length can be performed in the autocorrelation detecting circuit, control of the autocorrelation detecting circuit will be complicated.

It is therefore an object of the present invention to provide a radio transmitting apparatus and radio transmitting method for making a radio receiving apparatus perform symbol synchronization reliably and easily using guard intervals with variable length.

Means for Solving the Problem

The radio transmitting apparatus of the present invention employs a configuration having: an attaching section that provides a first guard interval and a second guard interval for every data part containing data symbols, the first guard interval being attached to a head of a data part and comprising a same symbol as part of symbols of the data part including a last part of the data part, or being attached to the head of the data part and comprising a first symbol that is the same as part of symbols of another data part immediately after the data part including a last part of the another data part, and the second guard interval being attached to a head of the first symbol and comprising a second symbol that is the same as the part of symbols of the data part including the last part of the data part; and a transmitting section that transmits a signal with one of the first guard interval and the second guard interval on a per data part basis.

Advantageous Effect of the Invention

According to the present invention, it is possible to make a radio receiving apparatus perform symbol synchronization reliably and easily using guard intervals with variable length.

BEST MODE FOR CARRYING OUT THE INVENTION

Embodiments of the present invention will be explained below in detail with reference to the accompanying drawings.

Embodiment 1

Figure 1:
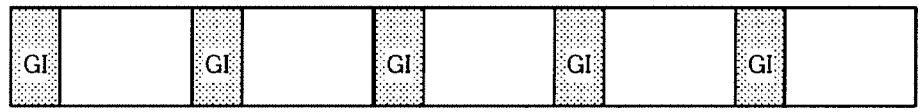
FIG. 1 illustrates a format of a transmission signal.
Figure 2:
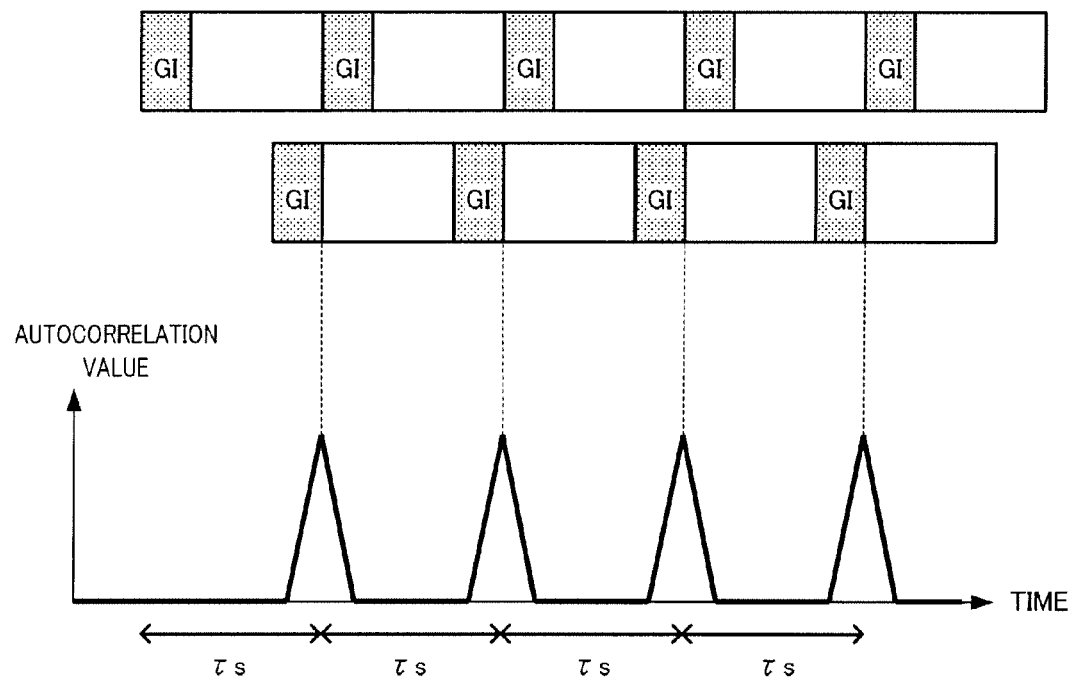
FIG. 2 illustrates a result of autocorrelation detection.
Figure 3:
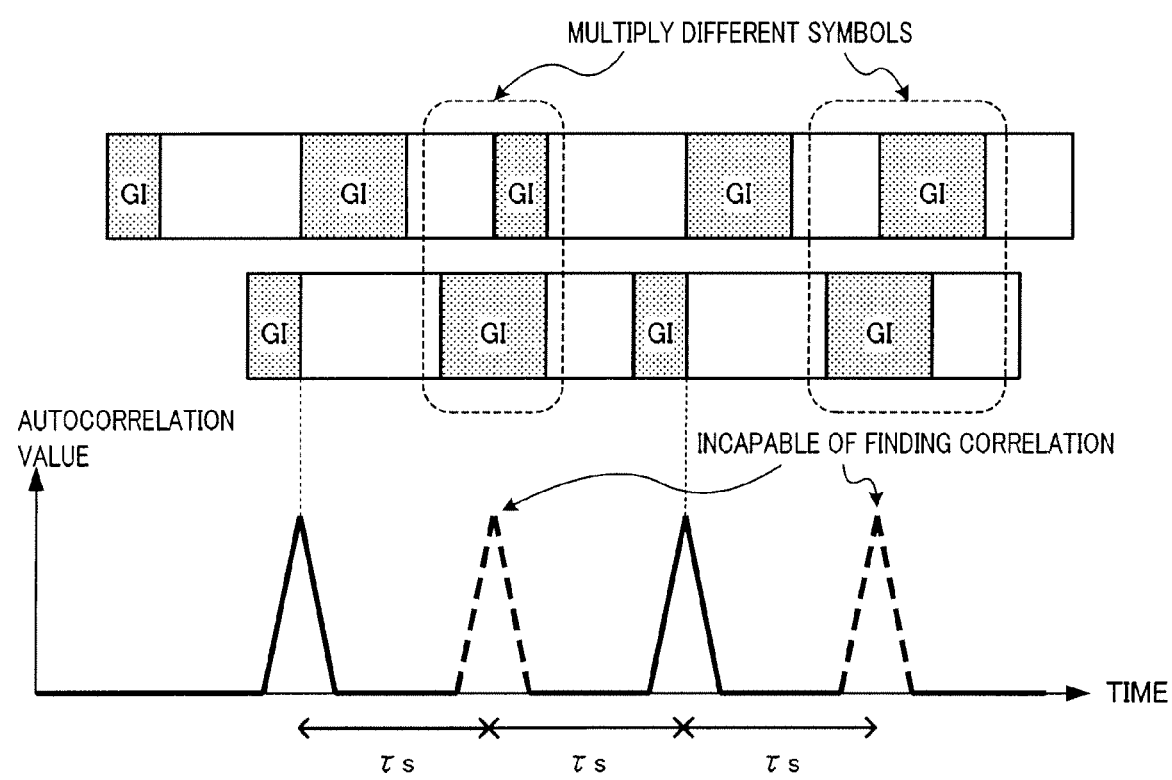
FIG. 3 illustrates a result of autocorrelation detection when a GI length is variable.
Figure 4:
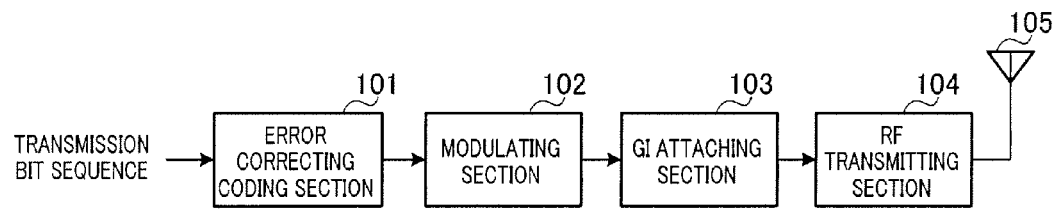
FIG. 4 is a block diagram showing a configuration of a radio transmitting apparatus according to Embodiments 1 and 2 of the present invention.

FIG. 4 is a block diagram showing the configuration of the radio transmitting apparatus according to Embodiment 1 of the present invention. In this figure, error correcting coding section 101 performs error correcting coding processing on a transmission bit sequence and outputs the encoded bit sequence to modulating section 102. Modulating section 102 performs modulation processing on the encoded bit sequence outputted from error correcting coding section 101 and outputs the modulated signal to GI attaching section 103.

GI attaching section 103 attaches one of two different types of GIs to the head of each data part storing a predetermined number of symbols of modulation signals outputted from modulating section 102. Here, one of the two types of different GIs is the GI with a short symbol length (hereinafter simply "short GI") and the other is the GI with a long symbol length (hereinafter simply "long GI"). Transmission data with a GI is outputted to RF transmitting section 104. GI attaching section 103 will be described later in detail.

RF transmitting section 104 performs up-conversion on the transmission data outputted from GI attaching section 103 in the radio frequency and transmits the transmission data subjected to up-conversion from antenna 105.

GI attaching section 103 will be explained below in detail. To attach a short GI, GI attaching section 103 copies a part of symbols including the last part of a data part and attaches the copied symbol to the head of the data part as a GI. Here, the length of a short GI is equal to the shortest of maximum delay times, which is defined by systems. Further, the length of a data part to be added a short GI is referred to as "τd."

Figure 5:
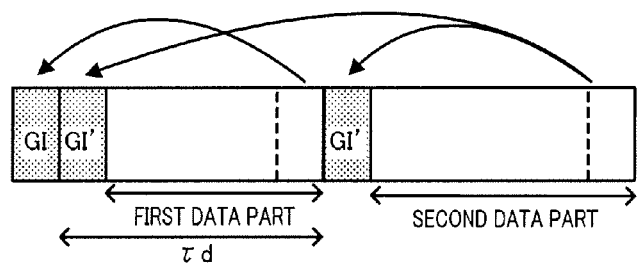
FIG. 5 illustrates a method of generating a long GI in a GI attaching section for explanation, according to Embodiment 1 of the present invention.

Further, to attach a long GI, as shown in FIG. 5, GI attaching section 103 copies a part of symbols including the last part of the second data part immediately after the first data part, and attaches the copied symbol to the head part of the first data part as a second GI (shown as "GI'" in the figure). Furthermore, GI attaching section 103 copies a part of symbols including the last part of the first data part and attaches the copied symbol to the head part of the second GI attached to the first data part as the first GI. Thus, the long GI is comprised of the first GI and the second GI. Here, the data part to be attached a long GI is shorter than τd, and the length of a long GI and a data part combined is "τs."

Figure 6:
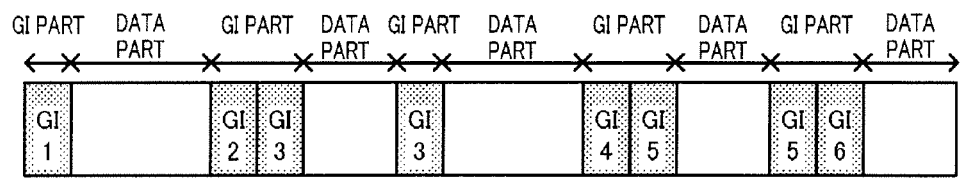
FIG. 6 illustrates a state where a short GI and a long GI are multiplexed, according to Embodiment 1 of the present invention.

As a reference, FIG. 6 illustrates a state where a short GI and a long GI are multiplexed. In FIG. 6, GIs are assigned the reference numerals 1 to 6 and the same reference numerals show the same symbol.

Figure 7:
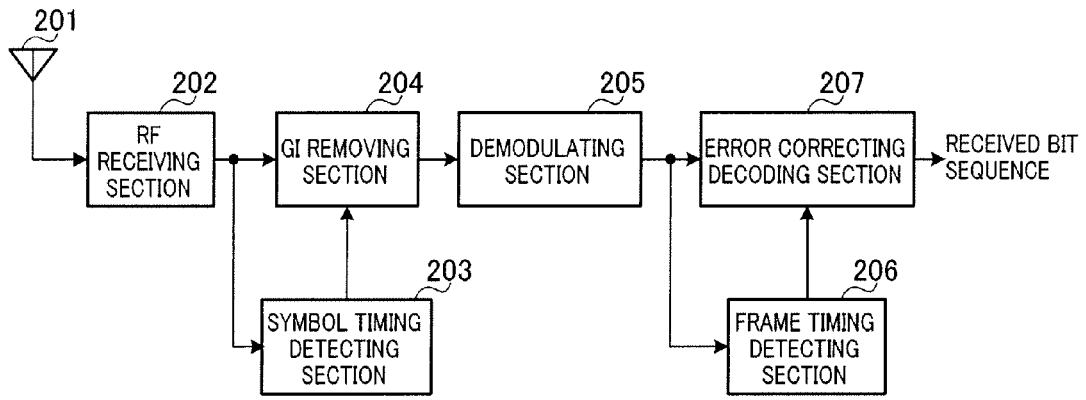
FIG. 7 is a block diagram showing a configuration of a radio receiving apparatus according to Embodiments 1 and 2 of the present invention.

FIG. 7 is a block diagram showing the configuration of the radio receiving apparatus according to Embodiment 1 of the present invention. In this figure, RF receiving section 202 performs down-conversion on the signal, transmitted from the radio transmitting section shown in FIG. 4 and received from antenna 201, and outputs the received signal subjected to down-conversion to symbol timing detecting section 203 and GI removing section 204.

Symbol timing detecting section 203 performs correlation calculation between the received signal outputted from RF receiving section 202 and the delayed received signal, detects peaks of the correlation value and the head timing of the data part. Symbol timing detecting section 203 generates a timing pulse at the head timing of the detected data part and outputs the generated timing pulse to GI removing section 204. Symbol timing detecting section 203 will be described later in detail.

GI removing section 204 removes the GI from the received signal outputted from RF receiving section 202 according to the timing pulse outputted from symbol timing detecting section 203, and outputs the received signal without the GI to demodulating section 205.

Demodulating section 205 performs demodulation processing on the received signal outputted from GI removing section 204 and outputs the demodulated received signal to frame timing detecting section 206 and error correcting decoding section 207. Frame timing detecting section 206 detects the head timing (i.e. frame timing) of the frame from the demodulated signal outputted from demodulating section 205, and reports the detected frame timing to error correcting decoding section 207. Error correcting decoding section 207 performs error correcting decoding processing on the demodulated signal outputted from demodulating section 205 based on the frame timing reported from frame timing detecting section 206 and outputs a received bit sequence.

Figure 8:
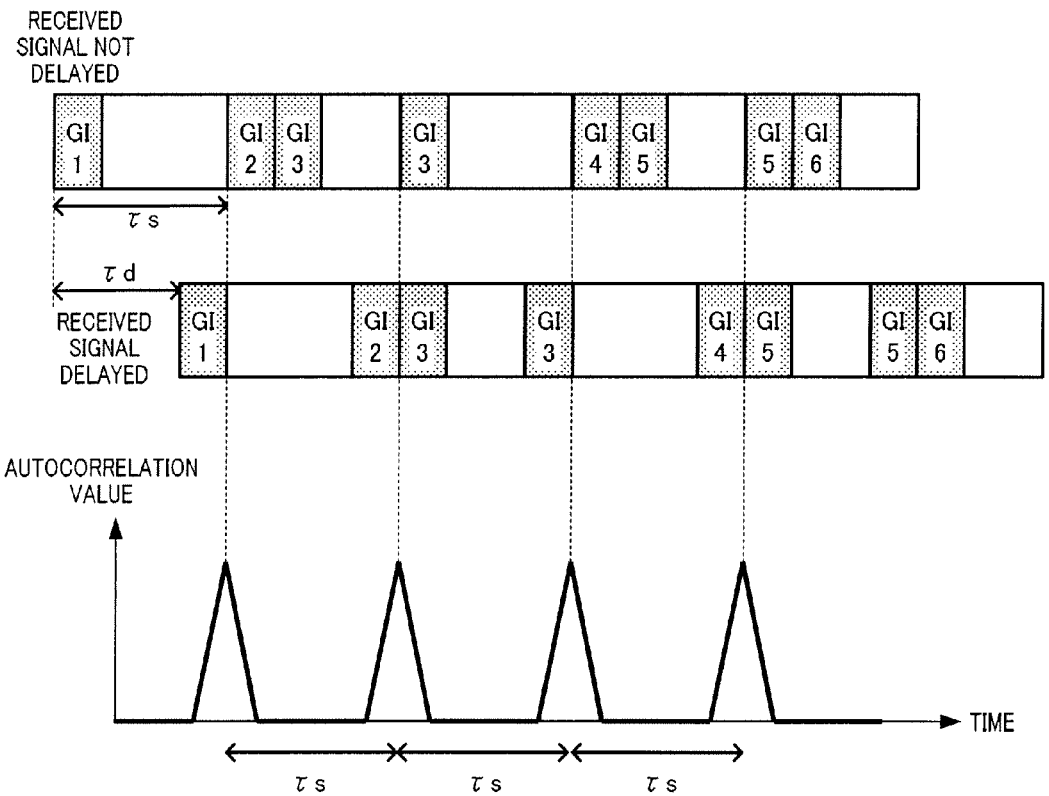
FIG. 8 illustrates a state of correlation calculation in a symbol timing detecting section for explanation, according to Embodiment 1 of the present invention.

Symbol timing detecting section 203 will be explained below in detail. Symbol timing detecting section 203 delays the received signal with a short GI by data part length τd, as shown in FIG. 8, performs correlation calculation between the received signal delayed and the received signal not delayed, and detects peaks of the correlation value. As shown in FIG. 8, by performing correlation calculation between the symbol of the short GI or long GI of the received signal delayed and the same symbol in the received signal not delayed, peaks of the correlation value can be found in a cycle of τs (τd+the short GI length), so that it is possible to realize reliable symbol synchronization.

As described above, according to Embodiment 1, when a long GI is attached to the first data part, by copying a part of symbols including the last part of the second data part immediately after the first data part and attaching the copied symbol to the head part of the first data part as a second GI and further by copying a part of symbols including the last part of the first data part and attaching the copied symbol to the head part of the second GI attached to the first data part as the first GI, it is possible to realize symbol synchronization easily and reliably even if a radio receiving apparatus receives a signal where a short GI and a long GI are multiplexed.

Embodiment 2

The radio transmitting apparatus and radio receiving apparatus according to Embodiment 2 of the present invention have similar configurations to configurations shown in FIGS. 4 and 7, respectively, and so these apparatuses will be explained using FIGS. 4 and 7.

Referring to FIG. 4, GI attaching section 103 attaches one of a short GI and a long GI to the head of each data part storing a modulation signal outputted from modulating section 102. In particular, to attach a short GI, GI attaching section 103 copies a part of symbols including the last part of a data part and attaches the copied symbol to the head of the data part as a GI. Here, the length of the data part to be attached a short GI is referred to as "τd."

Figure 9:
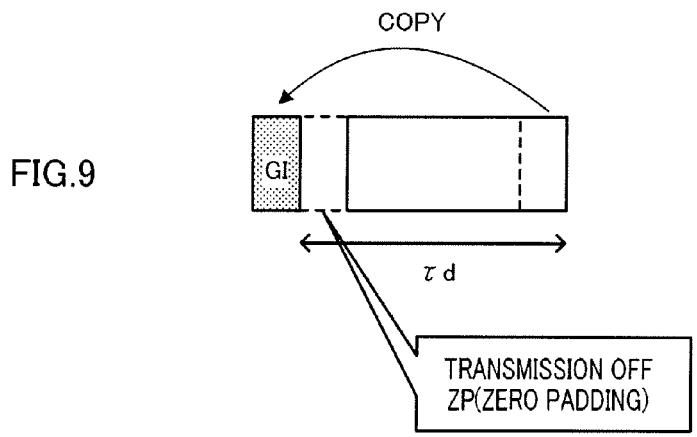
FIG. 9 illustrates a method of generating a long GI in a GI attaching section for explanation, according to Embodiment 2 of the present invention.
Figure 10:
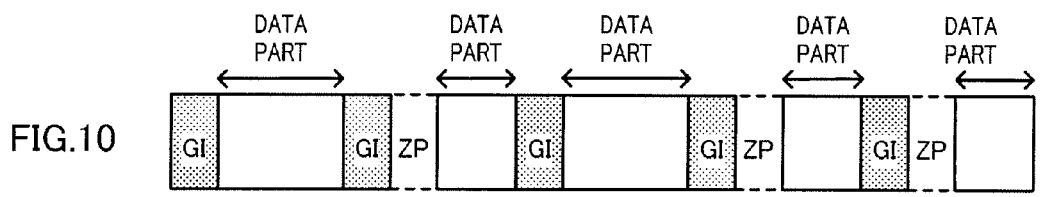
FIG. 10 illustrates a state where a short GI and a long GI are multiplexed, according to Embodiment 2 of the present invention.

Further, to attach a long GI, as shown in FIG. 9, GI attaching section 103 attaches non-transmitting ZP (Zero Padding) to the head of a data part, copies a part of symbols including the last part of the data part and attaches the copied symbol to the head of ZP attached to the data part as a GI. The length of ZP is adjusted such that the length of the data part to be attached ZP and ZP combined is τd. Thus, combining a GI and ZP makes a long GI. As a reference, FIG. 10 illustrates a state where a short GI and a long GI are multiplexed.

Figure 11:
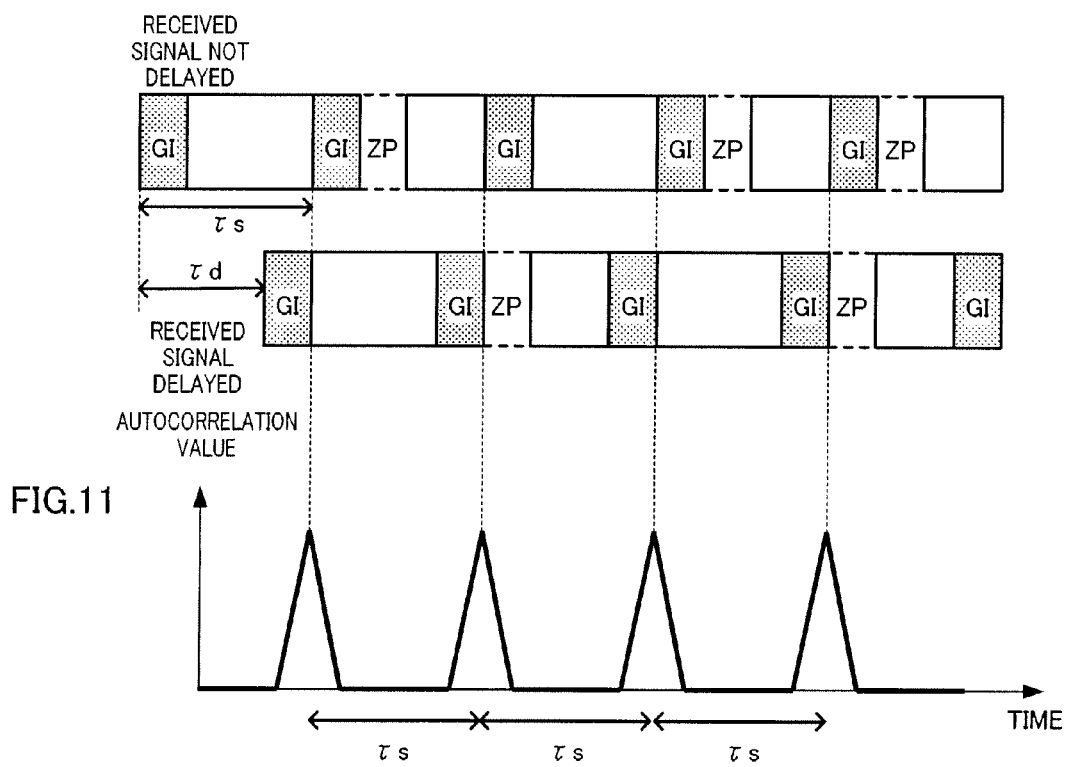
FIG. 11 illustrates a correlation calculation in a symbol timing detecting section for explanation, according to Embodiment 2 of the present invention.

Next, referring to FIG. 7, symbol timing detecting section 203 delays the received signal with a short GI by τd, and, as shown in FIG. 11, performs correlation calculation between a received signal delayed and a received signal not delayed and detects peaks of the correlation value. As shown in FIG. 11, by performing correlation calculation between the symbol of a short GI or a long GI in the received signal delayed and the same symbol in the received signal not delayed, it is possible to control a lower correlation value in the correlation calculation between ZP of the long GI in the received signal delayed and the received signal not delayed. By this means, peaks of the correlation value can be found in a cycle of τs, so that it is possible to realize reliable symbol synchronization.

As described above, according to Embodiment 2, when a long GI is attached to a data part, by attaching ZP to the head of the data part and copying a part of symbols including the last part of the data part and further by copying a part of symbols including the last part of the data part and attaching the copied symbol to the head of ZP attached to the data part, it is possible to realize symbol synchronization easily and reliably even if a radio receiving apparatus receives a signal where a short GI and a long GI are multiplexed.

Although a case has been described with the present embodiment where ZP is inserted to a long GI, the transmission of the second GI (i.e. GI') of the long GI described in Embodiment 1 may be stopped.

Further, although a case has been described with the above-described embodiments where the length of a long GI is fixed, the present invention is not limited thereto and the length of the long GI may be variable.

In the present embodiment, although the present invention is configured with hardware as an example, the present invention can also be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-245431, filed on Aug. 26, 2005, the entire content of which is expressly incorporated by reference herein.

INDUSTRIAL APPLICABILITY

The radio transmitting apparatus and radio transmitting method according to the present invention can make a radio receiving apparatus perform symbol synchronization reliably and easily using guard intervals with variable length, and are applicable to an OFDM scheme or single carrier scheme.

The invention claimed is:
1. A radio transmission apparatus comprising:
an attaching section that attaches a first guard interval or a second guard interval to a first data part comprising a plurality of symbols, wherein the attaching section is configured to:
    attach the first guard interval to a head of the first data part, the first guard interval including a first symbol from a first part of symbols that constitute the first data part, the first part of symbols including one or more symbols that constitute a last part of the first data part, and
    attach part of the second guard interval to the head of the first data part, the part of the second guard interval including a second symbol from a second part of symbols that constitute a second data part immediately after the first data part, the second part of symbols including one or more symbols that constitute a last part of the second data part, and to further attach a remainder of the second guard interval to a head of the second symbol, the remainder of the second guard interval including a third symbol from the first part of symbols that constitute the last part of the first data part; and
a transmitting section that transmits a signal comprising the first data part and one of the first guard interval and the second guard interval.

2. The radio transmission apparatus according to claim 1, wherein the attaching section further attaches a zero-padding to the head of the first data part as the second symbol.

3. A radio transmission method to be performed by a radio transmission apparatus, the radio transmission method comprising:
    attaching a first guard interval or a second guard interval to a first data part comprising a plurality of symbols,
        wherein the attaching of the first guard interval comprises attaching the first guard interval to a head of the first data part, the first guard interval including a first symbol from a first part of symbols that constitute the first data part, the first part of symbols including one or more symbols that constitute a last part of the first data part, and
        wherein the attaching of the second guard interval comprises attaching part of the second guard interval to the head of the first data part, the part of the second guard interval including a second symbol from a second part of symbols that constitute a second data part immediately after the first data part, the second part of symbols including one or more symbols that constitute a last part of the second data part, and further attaching a remainder of the second guard interval to a head of the second symbol, the remainder of the second guard interval including a third symbol from the first part of symbols constituting the last part of the first data part; and
    transmitting a signal comprising the first data part and one of the first guard interval and the second guard interval.

* * * * *